US009426137B2

(12) United States Patent
Caceres et al.

(10) Patent No.: US 9,426,137 B2
(45) Date of Patent: Aug. 23, 2016

(54) MOBILE DEVICE USER AUTHENTICATION BASED ON USER BEHAVIOR INFORMATION

(71) Applicant: Verizon Patent and Licensing Inc., Arlington, VA (US)

(72) Inventors: Manuel Enrique Caceres, Basking Ridge, NJ (US); Yuk Lun Li, Morganville, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/331,620

(22) Filed: Jul. 15, 2014

(65) Prior Publication Data

US 2016/0021081 A1    Jan. 21, 2016

(51) Int. Cl.
*H04L 29/06*    (2006.01)
*H04W 12/06*    (2009.01)
*H04L 29/08*    (2006.01)
*H04W 4/02*    (2009.01)

(52) U.S. Cl.
CPC .............. *H04L 63/08* (2013.01); *H04L 67/18* (2013.01); *H04L 67/22* (2013.01); *H04W 4/021* (2013.01); *H04W 4/023* (2013.01); *H04W 12/06* (2013.01)

(58) Field of Classification Search
CPC ......... H04L 63/08; H04L 67/18; H04L 67/22; H04W 12/06
See application file for complete search history.

(56) References Cited

U.S. PATENT DOCUMENTS

| 8,892,461 | B2* | 11/2014 | Lau ...................... H04W 12/06 705/14.4 |
| 9,185,095 | B1* | 11/2015 | Moritz ................. H04L 63/08 |
| 2011/0239276 | A1* | 9/2011 | Garcia Garcia ....... H04L 63/102 726/4 |
| 2011/0276396 | A1* | 11/2011 | Rathod ............. G06F 17/30867 705/14.49 |

OTHER PUBLICATIONS

Takeda, "User Identification and Tracking with Online Device Fingerprings Fusion", 2013 12th IEEE International Conference on Trust, Security and Privacy in Computing and Communications, pp. 163-167.*
Akyildiz et al., "The predictive user mobility profile framework for wireless multimedia networks", IEEE/ACM Transactions on Networking, 2004 vol. 12 issue 6, pp. 1021-1035.*
Hu et al., "Authenticating Location-based Services without Compromising Location Privacy", SIGMOD-12 Proceedings of 2012 ACM SIGMOD International Conference on Management of Data, May 2012.*

* cited by examiner

*Primary Examiner* — Luu Pham
*Assistant Examiner* — Harvey Cohen (57) ABSTRACT

Authentication involves collecting information relating to a user's behavior relative to a mobile device carried by the user, over a number of time periods that correspond to each other. An authentication technique includes processing the collected information to generate baseline data representing typical user behavior. The authentication technique includes collecting additional information relating to the user's behavior relative to the mobile device over another time period that corresponds to the time periods used to generate the baseline data. The additional information relating to the user's behavior is compared to the baseline data, and a difference between the additional information and the baseline data is determined. An authentication procedure is then applied based on the difference. The authentication may be performed by a mobile device such as a smartphone.

20 Claims, 5 Drawing Sheets

MOBILE DEVICE USER AUTHENTICATION BASED ON USER BEHAVIOR INFORMATION

BACKGROUND

In recent years, various authentication procedures have been used to ensure appropriate protection of and access to sensitive information and/or services. These procedures may be distinguished based on the category of information required to authenticate the user. Such categories include, for example, information the user knows (such as passwords or FINs), information the user has (such as key cards or fobs), or information about who the user is (such as fingerprints or retina scans).

For particularly sensitive information, more than one of the above types of authentication may be required of a particular user. However, the use of multiple different authentication requirements may be burdensome for legitimate users who frequently access sensitive information or services. Hence a need exists for authentication procedures that provide appropriate protection for sensitive information and services while minimizing the burden of access placed on legitimate users.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various systems, devices, and methods disclosed herein relate to user authentication. The examples described herein may provide enhanced protection for sensitive information and services while minimizing the time and difficulty involved in authenticating a user prior to access. These examples may be used in authentication procedures for, by way of example, computer log-ins, website log-ins, database access, etc.

The authentication methods described herein incorporate a category of information relating to the user's behavior preceding the authentication request. These methods may involve tracking a user's behavior over a period of time and comparing that behavior to a pattern of normal behavior for the user. Any differences identified by this comparison may be used when the authentication procedure is applied to modify or enhance the level of authentication required for the user before providing access to information or services.

Figure 1:
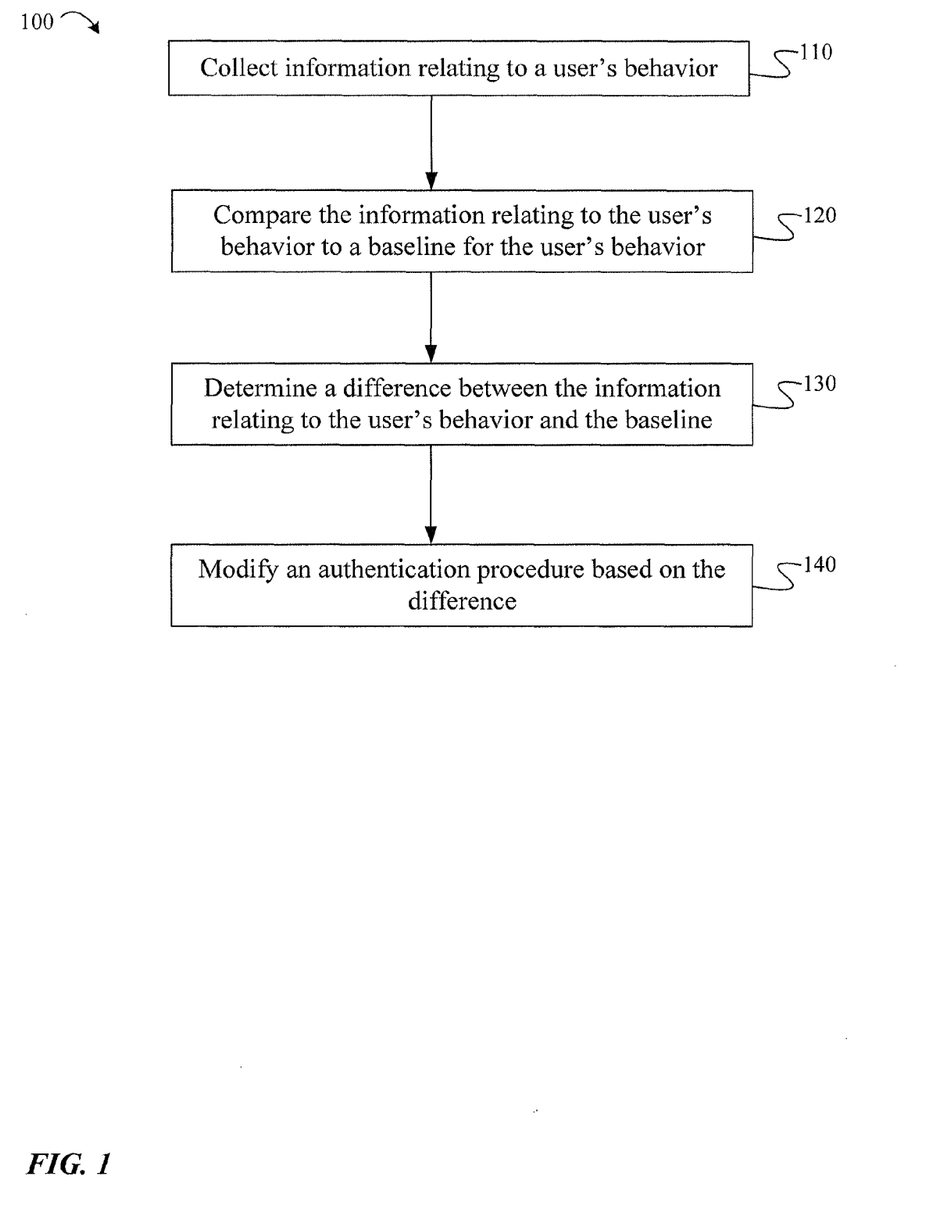
FIG. 1 is a high-level flow chart of an example of an authentication method.

Reference now is made in detail to the examples illustrated in the accompanying drawings and discussed below. FIG. 1 illustrates an authentication method 100. As a general overview, method 100 in this first example includes the steps of collecting behavioral information, comparing the information to a baseline, determining a difference, and modifying an authentication procedure based on the difference. Additional details about method 100 are set forth below.

In step 110, information relating to a user's behavior is collected. The information may be collected for a predetermined period of time preceding authentication, and/or may be continuously collected. The information collected about the user's behavior may include, for example, information about the user's location during the period of time, or information about what activities the user performed during the period of time. Other useful information regarding the user's behavior will be understood by one of ordinary skill in the art from the description herein.

In an example, the information relating to the user's behavior is collected with a mobile electronic device such as a smartphone. The widespread use of mobile devices provides an opportunity to collect information about a user's behavior over a majority of the day. As will be explained in greater detail below, the mobile device may include one or more sensors configured to continuously acquire information about the user's behavior over the course of the day. Alternatively or additionally, the user may be required to input information about their daily activities over the course of the day via a user interface on the mobile device.

It will be understood from the description herein that the mobile electronic device described in these examples is not limited to being a smartphone. For example, the mobile device may comprise other mobile devices such as personal digital assistants (PDAs), portable video game devices, portable music players, digital cameras, tablet computers, or other common mobile devices. Still further, the mobile device described herein may comprise wearable mobile technology, such as smart watches or wearable computing devices such as GOOGLE® GLASS™.

The information about activities performed by the user may, in one example, include information about the user's commercial activities. This information may include, for example, which websites the user shops at, what the user purchases, how the user pays for purchases, when the user makes purchases, and the user's location during any commercial transactions. This information may be collected particularly simply when the user utilizes his or her mobile device to effect the commercial transaction, either by making online purchases with an Internet-connected mobile device, or by making direct commercial purchases using the mobile device (e.g., using a digital wallet program). During such transactions, information about the user's purchasing activity may be separately stored by the mobile device.

In step 120, the information collected about the user's behavior is compared to a baseline for the user's behavior. The comparison may be performed by the device that collects the information (e.g., the mobile device), or may be performed by a separate or remote device to which the collected information is transmitted. The baseline for the user's behavior is dependent on the user's behavior before the predetermined period of time preceding authentication, e.g., the user's customary, daily behavior. Although the some of the examples below describe activities sensed by the mobile device while being carried by the user, many of the described behaviors may alternatively be sensed by a mobile device that is only proximate to the user, for example co-located with the user or separated from the user by a distance over which the activity may be sensed.

In an example, the baseline is created by the mobile device based on information obtained from the device's monitoring of the user's behavior. This monitoring may be continuous over a period of time, or may be performed at periodic intervals over a period of time. For example, the mobile device can collect information about the user's behavior once every five minutes or once every hour for multiple days or weeks. In one example, this pattern of user behaviors is correlated to and stored in conjunction with the time of day at which the behavior occurred. The user behavior information may also be stored in conjunction with the day during which the behavior occurred, for example, in order to account for differences in the user's behavior on different days of the week or between weekdays and weekends. Once enough information has been collected, the mobile device is programmed to create the baseline based on the most common behavior of the user at each time of day. The determination of whether enough information has been collected can be made based on a desired level of detail and granularity of the baseline to be created from this information, as will be explained below. For example, the mobile device may collect information over a period of a coupled weeks or a month before a reliable baseline can be created for a user. In another example, information may be collected over multiple intervals, for example, 5 to 30 days. One or more frequency distributions of the collected data may be generated. The determination may be made that a sufficient amount of data has been collected when the means and standard deviations of the frequency distributions are relatively unchanged, for example when they have a change of less than one to five percent, as data from each new interval is added.

The information collected to create the baseline may be stored as discrete samples, with each sample corresponding to an interval of time (e.g., five minute intervals). For each sample, the information includes sensor data obtained from the mobile device at a predetermined period of time (e.g., at the end of each interval). As an example, the information for creating the baseline may include data about the user's location (such as latitude and longitude as determined by a global positioning sensor or other location determining technique such as trilateration of cellular transmitter or colocation with Wi-Fi access points) acquired at five minute intervals over the course of a day.

In addition to storing information in intervals of time, the information may alternatively be stored based on the user's behavior. For example, the mobile device may store information about the user's behavior broken up by the user's location. In this example, while the user remains at the same approximately location (e.g., the same room or building), the mobile device stores information about the user's activity (e.g. is the user walking or sitting? Is the mobile device in a particular orientation, horizontal or vertical? Is the mobile device being used for texting, calling or accessing the Internet?). Once the user changes location, a new interval is created, and new behavior information is stored for the new location. In addition to or alternatively from separating the behavior information into intervals based on location, intervals may be delineated based on any measurement obtained by the mobile device, including motion, temperature, light, noise, etc.

When data not based on time interval tracking are employed in tracking and storing information about the user's behavior, it will be understood that time (in addition to any other data obtained about the user's behavior) may be used to perform comparisons and assess the user's authenticity. While the examples below focus primarily on the comparison of information obtained during time-based intervals, it will be understood that these same examples can be used to compare information obtained based on, e.g., location and/or behavior. For example, the disclosed methods may look at the length of time the user remains in a particular location, or the types of activities the user performs in a particular location, to assess authenticity in the manner described below.

After the information is acquired, the information is processed to create the values to be used as the baseline for the user's behavior. A frequency distribution for the information may be calculated in order to identify a user's most common behavior either over all of the intervals or during each interval over a number of days (i.e. the most frequently recurring sensed data), and to identify any second, less common (or frequent) behaviors. Referring to the location example, the acquired information about the user's location during each interval may be processed to determine a mean location for the user at each time of day, as well as a standard deviation from the mean location. In this way, instead of tracking a single most common behavior for the user during a time period, the baseline may include or otherwise reflect a range of common behaviors of the user for a particular time of the day.

Referring also to commercial activities, the information about the user's commercial activities may be used to create a baseline. In one example, the baseline may include a listing of one or more websites or physical locations at which the user has previously performed commercial transactions. These websites or locations may be added to the baseline following a predetermined number of transactions at a particular website or location. Alternatively or additionally, the baseline may include a similar listing or one or more payment types utilized by the user. These payment types (which may be broken up by individual cards such as credit cards, debit cards, or other instruments) may also be added to the baseline following a predetermined number of transactions using the particular payment type. Further, the baseline may include a listing or one or more products or services (or categories of products or services) purchased by the user. These products or services (such as groceries, coffee, fuel, etc.) may be added to the baseline following a predetermined number of purchases of that product or service. Still further, the baseline may include a mean time of day during which the user has previously made a similar type of transaction. The above listing provides examples of the types of commercial activity baselines that may be created for the user's behavior. Other baselines for assessing the user's commercial behavior will be apparent to one of ordinary skill in the art from the description herein.

The baseline for the user's behavior can be updated as information is collected by the mobile device. Such an update may occur continuously where the baseline represents a mean behavior or range of behaviors, or alternatively, may be periodically updated (e.g., weekly) to allow for sufficient data to be collected. Additionally, more recent behavior data may be weighted as more significant than older behavior data in creating the baseline.

Using a baseline for a user's location as an example, locations of the user occurring over the past week may be weighted more heavily in the calculation of a set of mean locations than locations of the user for preceding weeks.

Further, a predetermined number of outliner or extreme data points (e.g., location data falling well outside of the normal ranges for the user's location) may be removed from any calculations to obtain a more precise baseline for the user's location.

The information collected over the predetermined period of time is compared to the baseline based on when during the day the predetermined period of time occurs. As such, the mobile device first determines at which time of day the user behavior information falls, and then compares that user information with the portion of the baseline corresponding to that time of day. The device then compares the collected behavior information to the baseline for the user's behavior. Referring again to the location example, the collected information about the user's location during the predetermined period of time may be compared with the portion of the baseline representing the user's mean location at that time of day.

It will be understood that the location example referred to above is utilized for the purpose of illustration, and is not intended to be limiting. For another example, the collected information about the user's behavior may include an amount of sound (e.g., a decibel level) for the user's environment. This amount of sound may be processed to determine a mean noise level, or analyzed to determine common sound frequencies (which may relate to physiological information about the user such as respiration rate). Other values that may be determined from sensor data using standard statistical analysis will be apparent to those of ordinary skill in the art from the description herein. The practical value of these statistical values may be determined based on the desired behaviors (e.g., location, activity, etc.) to be monitored during the authentication method.

In step 130, a difference between the user's behavior and the baseline is determined. In particular, it is determined whether there is any difference between the user's behavior during the predetermined period of time and the user's behavior reflected in the baseline for that time of day.

In an example, the mobile device is programmed to determine whether there is a difference between the user's current or recent behavior and the baseline. The determination may be a binary, yes/no determination; if the user's behavior does not match the baseline behavior within a predetermined confidence level (e.g. zero to two standard deviations), the mobile device may generate a flag or other indicator that a difference exists.

However, the mobile device may determine differences on a sliding scale of differences. Referring to the location example, the user having a location relatively close to a mean location in the baseline, such as within a predetermined distance (e.g. 1-10 meters), may be predetermined to be a small difference. As the user's distance increases from the mean difference (e.g., beyond 50 meters), the difference may be determined to be large. In this example, increasing distance may represent a decreasing confidence in the authenticity of the user. The use of a non-binary difference may account for minor differences in a user's behavior from a normal routine. Additional examples of such determinations are set forth below.

As described below, an authenticity determination with a positive binary confidence value or a high confidence value on a sliding scale may not require any supplemental authentication. Lower confidence levels, however, may require additional input from the user before access is granted.

For one example, the baseline may reflect a range of common behaviors of the user for a particular time of the day. This range of common behaviors may be reflected in a mean or average value for the behavior (as explained in the location example), and in a standard deviation from the mean or average value for the behavior. In this example, the mobile device may determine whether the user's behavior for the predetermined period of time falls in the range of common behaviors (e.g., whether it is within a predetermined number of standard deviations from the mean value for the behavior). More common behaviors (behaviors within a predetermined number of standard deviations from the mean value) may result in a determination of a lesser difference, while less common or unique behaviors (behaviors beyond the predetermined number of standard deviations from the mean value) may result in a determination of a greater difference. In this example, the difference may be represented in the degree to which the collected information about the behavior differs from the mean behavior (either in absolute value or as represented by a multiple of standard deviations). Referring again to the location example, a difference in the user's location of less than one standard deviation (determined based on one or more frequency distribution of the user's location information over the period of time used to create the baseline) may be considered a common behavior, or within the range of behaviors covered by the baseline. A larger difference in the user's location (e.g. more than one or more standard deviations from the baseline location) may be considered uncommon, resulting in a larger difference and calling into question the user's authenticity.

For another example, the mobile device may determine a percentage difference over the predetermined period of time. In other words, the mobile device may compare a number of user behaviors for the period of time to the baseline, and determine both a number of matches and a number of differences. Referring to the location example, the mobile device may look at intervals of time (e.g., 5-20 intervals over a predetermined time period, for example one-half hour to one day), and then determine how many of those intervals match or substantially match the baseline value for each interval. The mobile device may then determine a percentage of the user's behavior for the period of time that was different from the baseline.

The above particulars of determining a difference are given by way of examples, and are not intended to be limiting. For example, while a single variable (location) is discussed above, it will be understood that determining the difference may comprise determining a difference in multiple variables (e.g., light level, noise level, etc.). In this example, noise level may be used in addition to location information to corroborate that the user is travelling by detecting noises made by the user's vehicle. Additionally, light level may be used in addition to location information to determine whether the user is sleeping (low light level) or is just reading or performing another activity in his or her bedroom (higher light level). Other processes for determining the difference between the user's behavior of the period of time and the baseline for the user's behavior may be selected based on the form and content of information included in the baseline, and will be apparent to those of ordinary skill in the art from the description herein.

Figure 2:
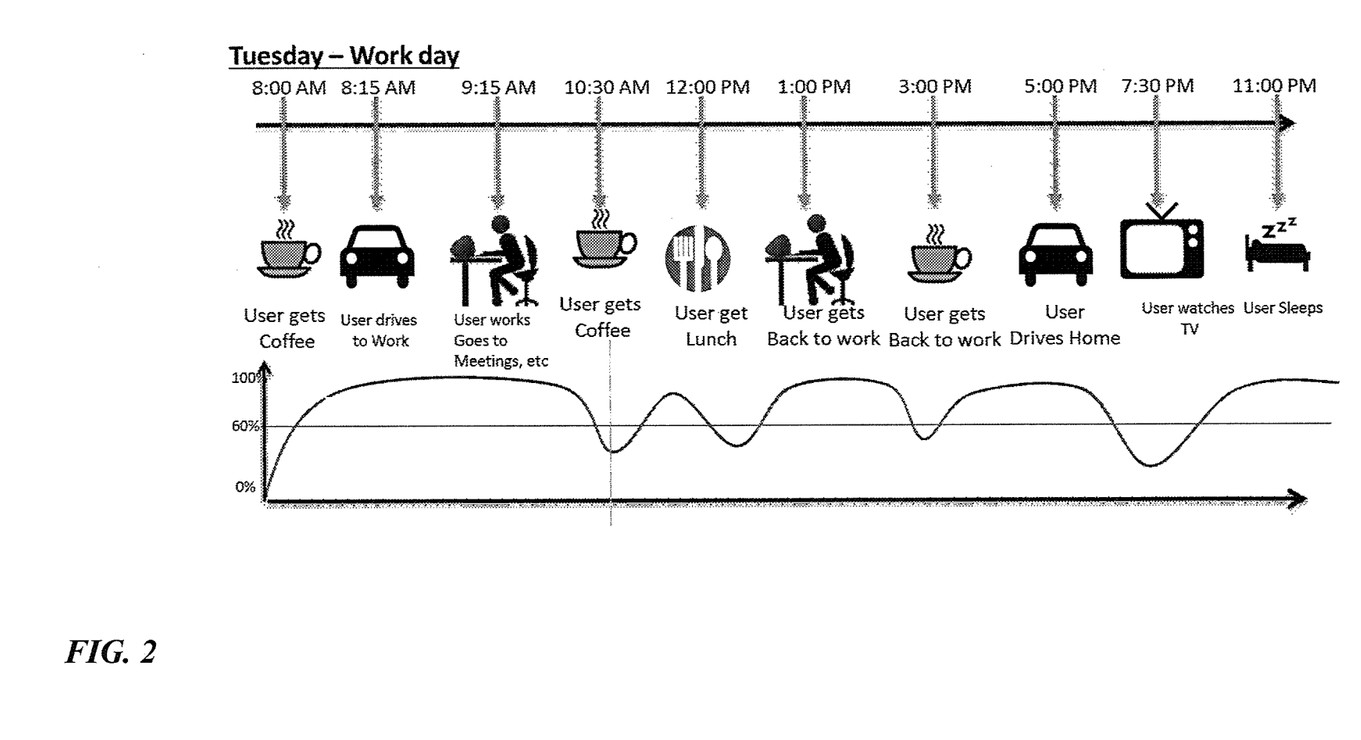
FIG. 2 is a simplified diagram of user behavior information collected according to the authentication method of FIG. 1.

FIG. 2 is a diagram illustrating examples of user behaviors. The top portion of the diagram illustrates a user's behaviors during the course of a day (or as shown in FIG. 2, a Tuesday/work day), while the bottom portion of the diagram illustrates the extent to which those behaviors match with or differ from the user's baseline of common behaviors. Where the user's behaviors are common or very near to the baseline, the diagram shows a high degree of match (e.g., above 60%) between the user's behavior and the baseline. For example, as shown in FIG. 2, the user customarily drives to work at 8:15

AM, and drives home at 5:00 PM. However, it is uncommon for the user to get coffee at 10:30 AM, or to watch TV at 7:30 PM. In those situations, there is a low degree of match (e.g., below 60%) between the user's behavior and the baseline, and additional authentication steps or information may be requested should the user need to be authenticated during these time periods. The low degree of match in those situations may arise from the user being at an uncommon location during that interval of time (in the case of the coffee break), or from the user being in an uncommonly loud environment during that interval of time (in the case of the television).

It will be understood that the detail provided in terms of the examples of a user's behavior in FIG. 2 is not intended to be limiting. A greater level of detail in the information about the user's activity or a higher granularity of time periods may be employed. For example, more detailed information may be employed where the information or services being accessed are particularly sensitive, and a better confirmation of authenticity is desirable. Additionally, a higher granularity of time periods may be employed where it is expected that users will need to be authenticated with some frequency (e.g., every time the user checks his or her email). Additionally, while specific activities of the user are referred to in FIG. 2, it will be understood that the identification of these activities is made for the purpose of illustration. The mobile device may instead store data indicative of these activities (such as sensor measurements of motion, temperature, light level, location, noise level and frequency spectrum, physiological characteristics) rather than a positive identification of the activities themselves.

In step 140, an authentication procedure is modified based on the difference. As used herein, the term "modified" is used to refer to any change, adjustment, addition, or alteration to the application of an authentication procedure. The authentication procedure may be any procedure used to authenticate a user before providing access to information and/or services. For example, an authentication procedure may be required any time the user attempts to complete a commercial transaction. The authentication procedure may require that the user provide information to demonstrate the user's authenticity, including, for example, information the user knows, information the user has, or information about who the user is. In this example, the authentication procedure may be one performed exclusively by the mobile device, or may be performed by a separate system configured to receive data from the mobile device, as will be discussed in greater detail herein.

In an example, the mobile device modifies an authentication procedure based on the difference determined between the user's behavior and the baseline. The authentication procedure being modified by the disclosed method may be one implemented by the user on a personal mobile device, e.g., to prevent unauthorized access to the mobile device. Alternatively, the authentication procedure may be implemented by a separate entity managing authentication and access of a number of users. In this example, method 100 is desirably implemented by an application running on each user's mobile device. The application may be configured to utilize existing sensors (such as cameras, microphones, etc.) and processing elements to perform the steps of method 100 recited herein.

Examples of modifications to authentication procedures which may be performed by the mobile device are set forth below.

For one example, the mobile device may be programmed to generate an authenticity value for the user based on the difference. The authenticity value may be dependent upon or may otherwise reflect the magnitude of the difference between the user's behavior during the time period and the baseline. The authenticity value may be used to determine what type of authentication (e.g. from among a number of available authentication procedures) is required or how many different types of authentication are required of the user. Referring to the location example, the authenticity value may represent a number of standard deviations the user's location is from the user's mean location for the particular time interval considered. In this example, the lower the user's authenticity value, the more likely the user is to be authentic, therefore the lower level or number of authentication procedure(s) may be required.

The authentication methodology need not limited to any particular form of authenticity value. For example, numeric or graded authenticity values may be used. Likewise, the authenticity value may be generated by the mobile device on a continuous or graded scale. Continuous values could include, for example, a number between 0 and 100, with 0 representing no authenticity and 100 representing highly reliable authenticity. Graded values could include, for example, a plurality of discrete ratings (e.g., inauthentic, possibly authentic, likely authentic) that are predetermined within the system, with the closed graded value being selected based on the determined difference. In this example, a high authenticity value, for example between 80 and 100 may not require any supplemental authentication. Lower levels, however, may require increasingly more reliable supplemental authentication. For example an authenticity value between 60 and 80 may require the user to enter a password or PIN while authenticity values between 40 and 60 may require a biometric identifier, such as a fingerprint, voiceprint, retinal scan or iris scan, and values below 40 may require both a biometric identifier and a password or PIN.

For another example, the mobile device may be programmed to require particular authentication information from the user when the difference between the user's behavior over the period of time and the baseline exceeds a predetermined threshold. The predetermined threshold for the difference may be selected based on a desired security for the authentication procedure, and/or may be selected based on how the difference is determined.

When the difference exceeds a predetermined threshold, the authentication procedure may require an additional type of information (e.g., a fingerprint scan) in addition to whatever authentication information (if any) is normally required (e.g., a user's PIN) before providing the user with access. This additional information may be required even in cases where normally no authentication information is required. Alternatively or additionally, when the authenticity value exceeds a predetermined threshold (either above or below the threshold, depending on the form of the value), the authentication procedure may require a particularly secure type of information (such as a fingerprint scan) before providing the user with access. In particular, the authentication procedure may require one or more particular types of information (such as biometric information and/or a PIN) in addition to or as an alternative to whatever authentication information is normally required when the authenticity value exceeds the predetermined threshold. Other types of authentication information that may be required when the difference exceeds a predetermined threshold will be understood to one of ordinary skill in the art from the description herein.

For still another example, the mobile device may be programmed to prevent access to a category of information or a particular service when the difference between the user's behavior over the period of time and the baseline exceeds a predetermined threshold. Again, the predetermined threshold for the difference may be selected based on a desired security for the authentication procedure, and/or may be selected based on how the difference is determined.

Where the user's behavior relating to commercial activities is being monitored and authenticated, the application of the authentication procedure may be particular important to ensuring the user's financial security. As such, particular information may be required from the user when any difference is detected between the user's baseline commercial behavior and a current attempted commercial transaction. Such differences may include, for example, an unusual geolocation for the user, an unusual purchasing time for the user, or an unusual type of purchase by the user. These differences may be determined based on the user's commercial baseline, as described above.

If during a commercial transaction the user performs a behavior that is different from the user's commercial baseline, the user will be further prompted to enter secret code or a password that is only known to the user. This behavior change, and the user's entry of the code or password, can be further communicated to the backend systems (described below), thereby enabling payment networks to enforce additional scrutiny for fraud management. For example, the additional information that is used to authenticate the user can include other passwords, such as email/device passwords, that the user maintains or that the user has recently entered on the mobile device (e.g., in the past ten minutes) before proceeding with the commercial transaction.

Figure 3:
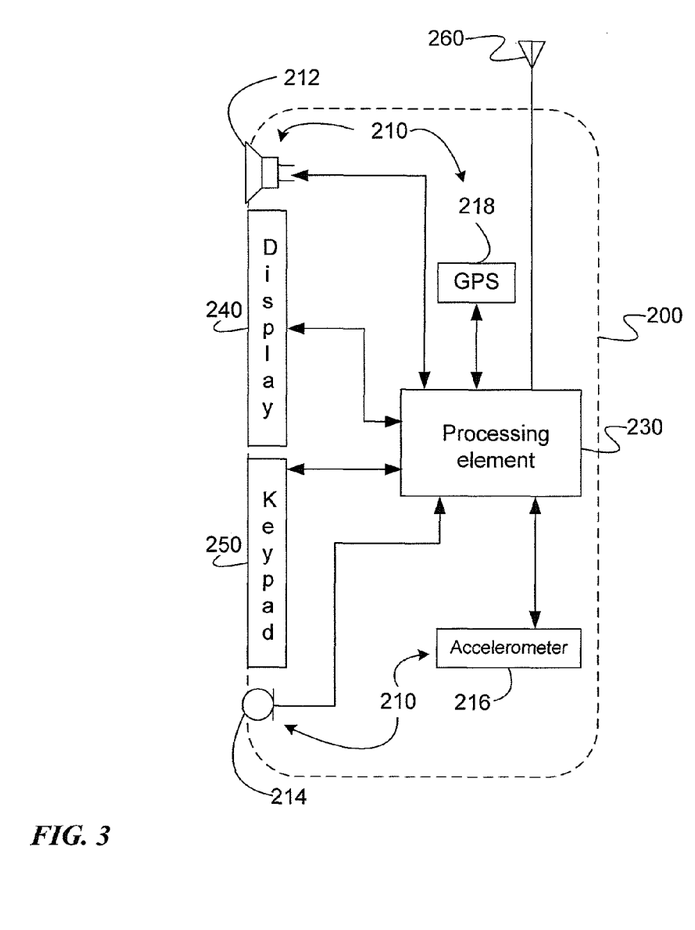
FIG. 3 is a high-level functional block diagram of an example of a mobile device for use in performing the authentication method of FIG. 1.

FIG. 3 illustrates an example of a mobile device 200, which may be involved in an authentication procedure of the type under consideration here. Mobile device 200 may be configured to perform the steps of method 100 set forth above. As a general overview, device 200 includes at least one sensor 210 and at least one processing element 230. Additional details about device 200 are set forth below.

Sensor 210 is configured to collect information relating to a user's behavior over a period of time. The form and structure of sensor 210 may be selected based on the type of information to be collected about the user's behavior. Examples of sensors that may be used as sensor 210 include one or more of the following types of sensors: position sensors (including global positioning sensors), speed sensors, orientation sensors, accelerometers, pedometers, pressure sensors, audio detectors (e.g. microphones), image sensors (e.g., cameras), physiological sensors (such as heart rate or breathing rate sensors), temperature sensors, and/or fingerprint sensors. Other suitable sensors will be apparent to one of ordinary skill in the art from the description herein.

The above sensors may be usable to collect general information about a user's behavior including the user's location, whether the user is travelling, how the user is travelling, whether the user is sleeping, exercising, or performing some other activity, whether the user is alone or with other people, how the user is interacting with or holding his or her mobile device, etc. This general information may also be usable to determine specific actions performed by the user, including: what time the user woke up in the morning, what time did the user enter his/her car, what is the average speed the user drove, did the user take his/her normal work drive, did the user make his/her usual stops (e.g. drop off kids at school, etc.), what sounds are normal on the user's environment (e.g., car noises, bus noises, sirens, etc.), or even how does the user customarily hold the mobile device. The above list of behaviors and actions are by way of examples, and other behaviors that can be derived from the above or other sensors will be apparent to those of ordinary skill in the art from the description herein.

Processing element 230 is in communication with sensor 210. Processing element 230 receives data from sensor 210 that includes information about the user's behavior. Processing element 230 is further programmed to perform one or more of the steps of method 100 using the information about the user's behavior received from sensor 210. In particular, processing element may be programmed to compare the information relating to the user's behavior to a baseline for the user's behavior, determine a difference between the user's behavior over the period of time and the baseline for the user's behavior, and modify an authentication procedure based on the difference, as described above with respect to method 100.

The performance of these steps can be done substantially as described above with respect to method 100. In particular, sensor data collected from sensors 210 is processed to create a baseline for the user's behavior. This processing may include the calculation of frequency distributions of multiple variables for multiple intervals of time over the course of a day or week, and may further include the calculation of the respective means and/or standard deviations for the sensor data collected. The comparison includes comparison of the newly collected user behavior to the baseline created by processing element 230, and the determination of a difference based on that comparison. The programming of a processing element to perform the above-described processing of received data, including the examples of calculations and comparisons set forth above, will be understood by one of ordinary skill in the art from the description herein.

In an example, mobile device 200 is a smartphone. The smartphone may include components such as microphones, cameras, touchscreens, or other elements capable of use as sensor 210. Likewise, the smartphone may include internal processing elements capable of being programmed to operate as processing element 230. The configuration of a smartphone as mobile device 200 may enable that device to perform the steps of method 100, as recited above.

Mobile device 200 is not limited to the above-described components, but may include additional components, as would be known to one of ordinary skill in the art from the description herein.

For example, as shown in FIG. 3, mobile device 200 may include a number of sensors 210, including a camera 212 for acquiring image information, a microphone 214 for acquiring audio information, an accelerometer 216 for acquiring movement information, or a global positioning sensor 218 for acquiring location information. These sensors are each in communication with processing element 230 for collecting information about the user's behavior, as set forth above.

Additionally, mobile device 200 may include one or more interface components for enabling the user to interface with device 200. As shown in FIG. 3, mobile device 200 may include a display 240 and a keypad 250. Display 240 may be a liquid crystal display, and/or may include a capacitive touch screen. In this example, display 240 may be operable to obtain both user substantive inputs from the user as well as behavior information from the user including pressure information or user tapping information. Keypad 250 may include one or more keys that can be actuated by the user to provide information, such as any authentication information required during an authentication procedure.

Still further, mobile device 200 may include one or more transceivers for transmitting information relating to the disclosed authentication methods when the authentication procedure is principally performed by a separate computing system. Processing element 230 may be programmed to transmit this information via an antenna 260. In an example, mobile device 200 transmits the difference between the user's behavior information and the baseline via antenna 260 to a separate computing system over a conventional wireless communication standard (e.g., a mobile phone network). Alternatively, the mobile device may be configured to transmit the information to a nearby device (e.g., over a Bluetooth link) that is itself configured to wirelessly transmit the information to the separate computing system at a remote location. This separate computing system may then modify the authentication procedure as necessary based on the difference information determined by mobile device 200.

In one example, the mobile device is a smartphone incorporating both a biometric fingerprint sensor and a capacitive touch screen which is capable of operation with the biometric fingerprint sensor. The touch screen may not only function as a source input, but can be used to continuously scan the positioning of the fingers and for use in performing authentication. In addition, the technology can be expanded to cover the entire mobile device by deploying the touch elements to the entire surface of the device.

Optionally, a second biometric fingerprint sensor can be provided covering the full area of the back of the mobile device. This enables the mobile device to continuously obtain fingerprint readings from both the back and front of the device. In this example, the mobile device is capable of acquiring information not only about the user's fingerprints from multiple fingers, but also about the way the user holds the phone (i.e. where and how the user's fingers contact the fingerprint sensors on the phone). For example, whether the user typically holds the phone with her left hand or right hand or whether the user's fingers are typically in particular positions, for example four fingers on the right side and the thumb on the left side or three fingers on the right side, one finger on the bottom and the thumb on the left side.

The continuous reading of the user's fingerprint can provide a number of advantages. For one example, this information can be used to continuously authenticate the user based on their fingerprints, thereby enabling secure functionality for a predefined period of time (during which the user is holding his or her phone). In other words, if the device does not sense the user's fingerprint, the device can disable certain functionalities (e.g. not allow certain applications to be launched, encrypt files, close password vaults, stop hardware, etc.) or completely prevent access to or use of the mobile phone.

The device may allow certain functionality only when a predefined number of fingers have been detected either simultaneously or progressively. For example, if the device senses contact by the index finger and thumb of the user within 0.5 to 5 seconds, it enables or launches applications and or settings, custom policies, file decryption, special encryption algorithms.

The mobile device of this example may further enable the user to provide authentication information via a series or pattern of taps. For example, the user can tap geometric patterns along the surface of the device as a form of two factor authentication, with the first factor being the fingerprint match and the second factor being the pattern of taps performed.

While only a single mobile device 200 is described above with respect to performance of the disclosed methods, it will be understood that the authentication methods described herein may be performed by multiple devices associated with the same user, either in cooperation or independently. For example, in addition to a smartphone, a user may also maintain a tablet and a work computer. When information about to the user's behavior may be collected from any one of these devices, that information may be used to authenticate the user to other co-located devices or may be combined with behavior information collected by any of the other devices for joint authentication. This combined set of user behavior information may be stored by each of these devices or in a centralized location (as discussed below). In this cooperative example, whenever the user needs to be authenticated by any of these devices, that device may access the information about the user's behavior and the baseline (either locally or remotely) to perform the disclosed authentication methods.

For example, if the usage information of the user's smartphone is sufficient to authenticate the user, this authentication may be communicated to a co-located tablet device, for example, via a shared application, without requiring any authentication based on use of the tablet.

Figure 4:
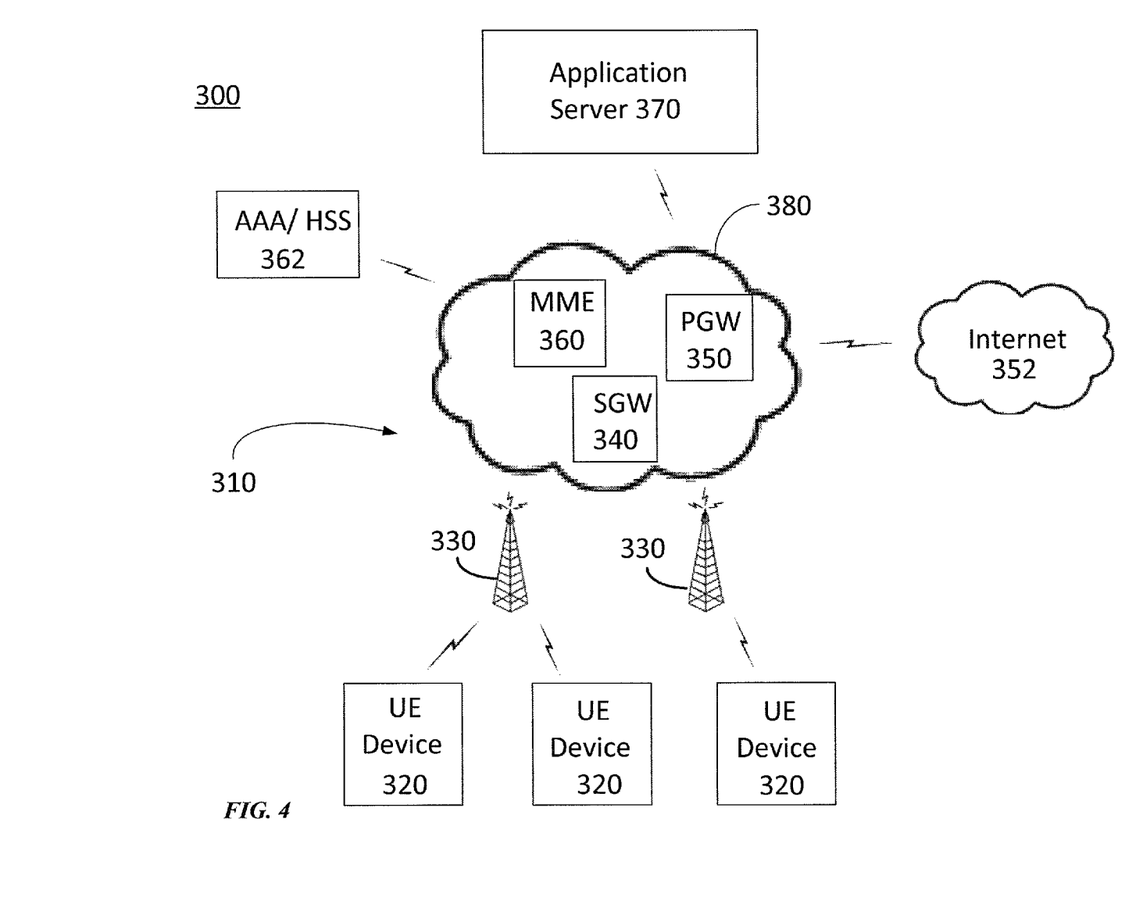
FIG. 4 is a high-level functional block diagram of an example of a system for use in performing the authentication method of FIG. 1.

As set forth above, the underlying authentication procedure modified by the method examples disclosed herein may be one performed exclusively by one or more mobile devices, or may be performed by a separate system configured to receive data from one or more mobile devices, as will be discussed in greater detail herein. FIG. 4 illustrates an example of a system 300 for use in performing an authentication method. As a general overview, system 300 includes a network environment 310 including multiple user equipment (UE) devices 320. UE devices 320 may be mobile devices substantially as described above with respect to mobile device 200. UE devices 320 may also be configured to perform one or more of the steps of method 100.

UE devices 320 obtain content, including information and services, via a number of base stations. Accordingly, the network environment 310 also includes base stations 330. The network also includes a Service Gateway (SGW) 340 that is configured to communicate packet data with the UE devices 320 via the base stations 330, a packet data network gateway (PGW) 350 that provides an interface between the SGW 340 and a global information network (e.g. the Internet®) 352, a mobility management entity (MME) device 360 that is coupled to home subscriber service (HSS), authentication, authorization and accounting (AAA) server 362 to provide user profiles, authorization, authentication and accounting services for the data streams accessed by the UE devices 320. An application server (AS) 370 controls the performance of network-level applications with respect to the UE devices 320. The number of devices and/or networks, illustrated in FIG. 4, is provided for explanatory purposes only. In practice, there may be additional devices and/or networks, fewer devices and/or networks, different devices and/or networks, or differently arranged devices and/or networks than illustrated in FIG. 4.

Implementations of system 300 are described as being performed within a radio access network (RAN) that is based on a LTE network for explanatory purposes. In other implementations, the implementations may be performed within a RAN that is not based on a LTE network.

Network environment 310 may include an evolved packet system (EPS) that includes a LTE network and/or an evolved packet core (EPC) 380 that operates based on a third generation partnership project (3GPP) wireless communication standard. The LTE network may be a RAN that includes one or more small base stations 330 that take the form of eNBs. The EPC 380 may include SGW 340, PGW 350, and/or MME 360 that enable UE devices 320 to communicate with AS 370, using unicast/multicast transmissions, and/or an Internet protocol (IP) multimedia subsystem (IMS) core (not shown).

With reference again to FIG. 4, UE device 320 may include any computation or communication device, such as a wireless mobile communication device that is capable of communicating with base station 330 and/or a server (e.g., AS 370). In addition to those examples set forth above with respect to mobile device 200, examples of the UE device 320 include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smartphone, a laptop computer, a tablet computer, a camera, a personal gaming system, or another type of mobile computation or communication device. UE device 320 may send traffic to and/or receive traffic from AS 370. The UE device 320 is programmed with applications that access content from the network 310. An example UE device 320 may have multiple device-level applications running at a given time.

SGW 340 may include one or more computation or communication devices that gather, process, search, store, and/or provide information in a manner described herein. SGW 340 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 340 may aggregate traffic received from one or more base stations 330 associated with the LTE network, and may send the aggregated traffic to AS 370 (e.g., via PGW 350) and/or other network devices associated with the EPC 280. SGW 340 may also receive traffic from the other network devices and/or may send the received traffic to UE device 320 via base station 330. SGW 340 may perform operations associated with handing-off UE devices 320 from and/or to other base stations 330 in the LTE network.

PGW 350 may include one or more computation or communication devices that gather, process, search, store, and/or provide information in a manner described herein. PGW 350 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 350 may include a device that aggregates traffic received from one or more SGWs 340, etc. and may send the aggregated traffic to AS 370, to the Internet 352, or other network devices. In another example implementation, PGW 350 may receive traffic from AS 370 or from the Internet 352, and may send the traffic toward one of the UE devices 320 via SGW 340 and base stations 330.

MME 360 may include one or more computation or communication devices that gather, process, search, store, and/or provide information in a manner described herein. For example, MME 360 may perform operations associated with handing off UE device 320, from a first base station to a second base station, when the UE device 320 is entering the geographic area of the second base station. The MME 360 may also interface with the AAA/HSS server 362 to provide authentication, authorization and accounting services for the EPC 380. Depending on the data requirements of a particular network-level application, when a UE device can be served by multiple base stations, the AS 370 may interact with the MME 360 to balance the load by handing off a UE device 320 from a base station with a relatively high bandwidth load to a base station with a relatively low bandwidth load.

HSS/AAA server 362 may include one or more devices that gather, process, search, store, and/or provide information in a manner described herein. For example, HSS/AAA server 362 may manage, update, and/or store, in a memory associated with HSS/AAA server 362, profile information, associated with user device 320, that identifies information, applications, and/or services that are permitted for and/or accessible by user device 320; information associated with a user of user device 320 (e.g., a username, a password, a personal identification number (PIN), etc.); rate information; minutes allowed; and/or other information. Additionally or alternatively, HSS/AAA server 362 may perform authentication, authorization, and/or accounting (AAA) operations associated with a communication session with user device 320. MME 360 may receive authorization from HSS/AAA server 362, in response to an attachment request from user device 320, before MME 36- creates and stores a context for user device 320.

In an example, the authentication procedure modified in accordance with the method examples described herein is performed by the HSS/AAA server 362 as part of its management of profile information for user device 320. Each user device 320 may collect information about the user's behavior, as described above, and then transmit the raw information collected about the user's behavior via network 310, rather than maintaining the baselines and performing the comparisons on user device 320. In this example, HSS/AAA server 362 may create, store, maintain, and update the baselines of behavior for each user of each devices 320 along with the other information associated with the user of each device 320. When HSS/AAA server 362 performs AAA operations, it may modify those operations based on the difference it determines between the user's current behavior and the baseline for the user's behavior maintained as part of the user's profile. Modifications to the AAA operations may take any of the forms described herein, including requiring additional authentication information from the user before enabling access to content such as the information, applications, and/or services that are identified by HSS/AAA 362 as being permitted for and/or accessible by user.

When authentication procedures are applied during commercial transactions, additional information associated with the procedure may also be transmitted to backend systems such as HSS/AAA server 362. This additional information includes geolocation, time of day, and/or point-of-service terminal or merchant where the payment was made. This information can also be transmitted to payment networks via the LTE interface, in order to create a closed loop authentication for the commercial transaction service. Having this information about the user's commercial behavior may assist mobile management platforms in seamlessly authenticating consumers, in order to provide services to users. The application of authentication procedures on the backend can provide enhanced security for the user's financial information without compelling them endure the process of entering complex passwords and PINs before performing a commercial transaction (such as a digital wallet transaction) with the mobile device.

Alternatively, user devices 320 may create and maintain the baselines, and determine differences between the user's behavior and the baseline on the user device 320 itself. In this example, a user device 320 may invoke the HSS/AAA server 362 to authenticate a user when a level of difference between the user's behavior and the baseline indicates that the current user may not be the authorized user. HSS/AAA server 362 may use the difference data to determine whether or not to modify the AAA operations performed for the user device 320.

As another alternative, the AS 370 may include an application that, for each UE device 320, receives sensor data from the UE device and creates and maintains the baselines. The application on the AS 370 may also determine differences between the user's behavior and the baseline data. As with the previous example, the HSS/AAA 362 may be invoked to authenticate the user when the user's recent behavior, as indicated by a difference between recently received data and the baseline data, indicates that the current user may not be the authorized user of the mobile device 320.

While implementations described herein are described primarily in the context of broadband services to/from the UE devices via LTE, other wireless standards may be used. For example, components conforming to LTE standards described herein may be replaced by components conforming to other network standards (e.g., GSM, WCDMA, UMB, UMTS, CDMA2000, HSPA, 802.11, or other network standards).

Figures 5, 6:
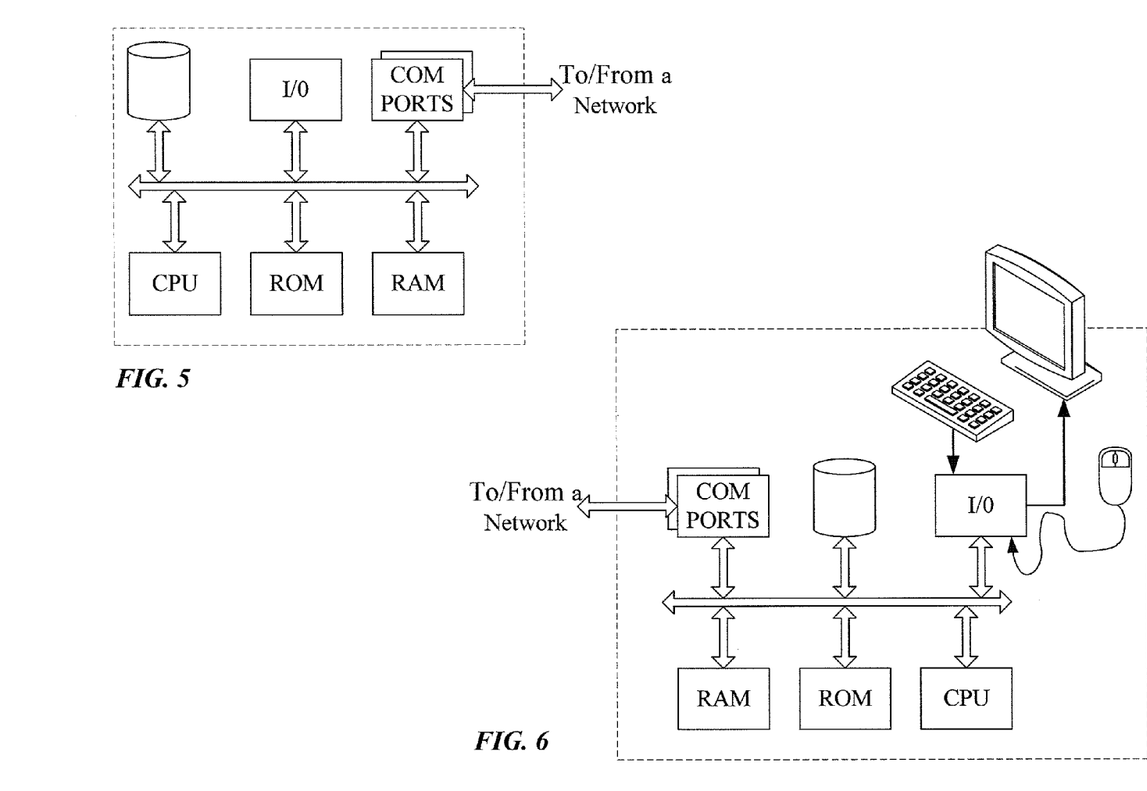
FIG. 5 is a simplified diagram of a network or host computer platform
FIG. 6 is a simplified diagram of a computer with user interface elements.

FIGS. 5 and 6 provide functional block diagram illustrations of general purpose computer hardware platforms. FIG. 5 illustrates a network or host computer platform, as may typically be used to implement a server, such as application server 370 or AAA/HSS 362. FIG. 6 depicts a computer with user interface elements, as may be used to implement a personal computer or other type of work station or terminal device, although the computer of FIG. 6 may also act as a server if appropriately programmed. It is believed that the general structure and general operation of such equipment as shown in FIGS. 5 and 6 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the authentication methods outlined above may be embodied in programming. Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. As used herein, unless restricted to non-transitory, tangible "storage" media, terms such as computer or machine "readable medium" refer to any medium that participates in providing instructions to a processor for execution.

Hence, a machine-readable medium may take many forms. Non-volatile storage media include, for example, optical or magnetic disks, such as any of the storage devices in any computer(s) or the like, such as may be used to implement the authentication methods shown in the drawings. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

The foregoing examples relate to authentication methods for a user employing, for example, a mobile device. These example methods can include collecting information relating to a user's behavior relative to the mobile device over a plurality of time periods. The information may be collected by the processor of the mobile device using one or more sensors. For example, the information may include the location of the user over a plurality of time periods over the course of days or weeks. The example methods can also include processing the collected information to generate baseline data representing the user's typical behavior. For example, the baseline data for the user may include a mean location for the user during each of a plurality of time periods, or a range of locations for the user (defined by a standard deviation of the user's location from the mean). The example methods can also include collecting further information relating to the user's behavior relative to the mobile device over a further time period occurring after the plurality of time periods. For example, when it becomes necessary to authenticate a user, the latest information about the user's location may be collected and analyzed by the processor of the mobile device. The example methods can also include comparing the further information to the baseline data, and determining a difference between the further information and the baseline data. For example, the processor of the mobile device can compare the latest information about the user's location to the baseline for the user's location during a corresponding time period, and calculate the difference, whether an absolute difference (e.g. in meters) or a relative difference (e.g. in standard deviations from the mean location). The example methods can also include applying an authentication procedure to authenticate the user based on the difference. For example, when the user's location different from the mean location by more than a predetermined threshold, (either in absolute terms, as a percentage or in terms of a number of standard deviations), the mobile device may require additional or alternative information from a user (e.g. biometric information such as fingerprint or retina scans) beyond what is normally required to authenticate the user (e.g., a PIN, if any information is required).

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   receiving, by a device and at periodic intervals over a plurality of time periods, user information associated with a behavior of a user relative to a mobile device associated with the user,
   the user information including:
      information associated with locations of the mobile device during the periodic intervals over the plurality of time periods, and
      other information associated with activities performed by the mobile device during the periodic intervals over the plurality of time periods;
   generating, by the device, at least one frequency distribution based on the user information and as the user information is received at each periodic interval over the plurality of time periods;
   determining, by the device and as the user information is received at each periodic interval over the plurality of time periods, whether user information, satisfying a predetermined threshold, is received to generate baseline user data that represents typical user behavior;
   processing, by the device, the user information to generate the baseline user data, at each periodic interval over the plurality of time periods, when the user information, satisfying the predetermined threshold, is received,
      processing the user information comprising generating the baseline user data based on a most common behavior of the user relative to the mobile device during a particular time of day;
   receiving, by the device and after the baseline user data is generated, additional user information associated with the behavior of the user relative to the mobile device,
      the additional user information comprising different information associated with an activity performed by the mobile device after the baseline user data is generated,
      the user being proximate to the mobile device during the activity;
   comparing, by the device, the additional user information to the baseline user data;
   determining, by the device, a difference between the additional user information and the baseline user data based on the comparing;
   selecting, by the device, an authentication procedure, from a plurality of authentication procedures, based on the difference between the additional user information and the baseline user data; and
   applying, by the device, the authentication procedure to authenticate the user.

2. The method of claim 1, wherein the additional user information comprises different information associated with a location of the mobile device after the baseline user data is generated.

3. The method of claim 1, wherein the baseline user data comprises data representing a range of behaviors of the user, relative to the mobile device, during particular times of a day.

4. The method of claim 1, wherein comparing the additional user information to the baseline user data comprises:
   determining a time of day after the baseline user data is generated, and
   comparing the additional user information to the baseline user data based on the determined time of day.

5. The method of claim 1, wherein applying the authentication procedure comprises:
   generating a value representing an authenticity of the user based on the difference between the additional user information and the baseline user data, and
   requesting authentication information to authenticate the user based on the value representing the authenticity of the user.

6. The method of claim 1, wherein applying the authentication procedure comprises:
requesting authentication information from the user when the difference between the additional user information and the baseline user data exceeds another predetermined threshold.

7. The method of claim 1, wherein applying the authentication procedure comprises:
preventing access to a category of information or a service when the difference between the additional user information and the baseline user data exceeds another predetermined threshold.

8. The method of claim 1, further comprising:
utilizing the mobile device to apply the authentication procedure.

9. The method of claim 1, where the mobile device is associated with a sensor that provides the user information and the additional user information to the device.

10. The method of claim 9, where the sensor comprises one of a physiological sensor or a position sensor.

11. A mobile device, comprising:
at least one sensor to:
receive, at periodic intervals over a plurality of time periods, user information associated with a behavior of a user relative to the mobile device,
the user information including:
information associated with locations of the mobile device during the periodic intervals over the plurality of time periods, and
other information associated with activities performed by the mobile device during the periodic intervals over the plurality of time periods; and
receive, over a time period occurring after the plurality of time periods, additional user information associated with the behavior of the user relative to the mobile device; and
at least one processor to:
generate at least one frequency distribution based on the user information and as the user information is received at each periodic interval over the plurality of time periods;
determine, as the user information is received at each periodic interval over the plurality of time periods, whether user information, satisfying a predetermined threshold, is received to generate baseline user data that represents typical user behavior;
process the user information to generate the baseline user data, at each periodic interval over the plurality of time periods, when the user information, satisfying the predetermined threshold, is received,
the at least one processor, when processing the user information, is to generate the baseline user data based on a most common behavior of the user relative to the mobile device during a particular time of day;
compare the additional user information to the baseline user data,
the additional user information comprising different information associated with an activity performed by the mobile device after the baseline user data is generated,
the user being proximate to the mobile device during the activity;
determine a difference between the additional user information and the baseline user data based on the comparing;

select an authentication procedure, from a plurality of authentication procedures, based on the difference between the additional user information and the baseline user data; and
apply the authentication procedure to authenticate the user.

12. The mobile device of claim 11, wherein the at least one sensor comprises at least one physiological sensor or at least one position sensor.

13. The mobile device of claim 11, wherein the at least one processor is further to:
determine a time of day associated with the time period, and
compare the additional user information to the baseline user data based on the determined time of day.

14. The mobile device of claim 11, wherein the at least one processor is further to:
generate a value representing an authenticity of the user based on the difference between the additional user information and the baseline user data.

15. The mobile device of claim 11, where the at least one processor is further to:
request authentication information from the user when the difference between the additional user information and the baseline user data exceeds another predetermined threshold.

16. The mobile device of claim 11, where, when applying the authentication procedure, the at least one processor is to:
generate a value representing an authenticity of the user based on the difference between the additional user information and the baseline user data; and
request authentication information to authenticate the user based on the value representing the authenticity of the user.

17. A computer-readable storage medium for storing instructions, the instructions comprising:
one or more instructions that, when executed by one or more processors of a device, cause the one or more processors to:
receive, at periodic intervals over a plurality of time periods, user information associated with a behavior of a user relative to a mobile device associated with the user,
the user information including:
information associated with locations of the mobile device during the periodic intervals over the plurality of time periods, and
other information associated with activities performed by the mobile device during the periodic intervals over the plurality of time periods;
generate at least one frequency distribution based on the user information and as the user information is received at each periodic interval over the plurality of time periods;
determine, as the user information is received at each periodic interval over the plurality of time periods, whether user information, satisfying a predetermined threshold, is received to generate baseline user data that represents typical user behavior;
process the user information to generate the baseline user data, at each periodic interval over the plurality of time periods, when the user information, satisfying the predetermined threshold, is received,
the one or more instructions, that cause the one or more processors to process the user information, cause the one or more processors to generate the baseline user data based on a most common behavior of the user relative to the mobile device during a particular time of day;

receive, after the baseline user data is generated, additional user information associated with the behavior of the user relative to the mobile device,
the additional user information comprising different information associated with an activity performed by the mobile device after the baseline user data is generated,
the user being proximate to the mobile device during the activity;

compare the additional user information to the baseline user data;

determine a difference between the additional user information and the baseline user data based on the comparing;

select an authentication procedure, from a plurality of authentication procedures, based on the difference between the additional user information and the baseline user data; and apply the authentication procedure to authenticate the user.

18. The computer-readable storage medium of claim 17, wherein the one or more instructions that cause the one or more processors to compare the additional user information to the baseline user data, comprise:
one or more instructions that, when executed by the one or more processors, cause the one or more processors to:
determine a time of day after the baseline user data is generated, and
compare the additional user information to the baseline user data based on the time of day.

19. The computer-readable storage medium of claim 17, where the baseline user data comprises data representing a range of behaviors of the user, relative to the mobile device, during particular times of a day.

20. The computer-readable storage medium of claim 17, where the one or more instructions that cause the one or more processors to apply the authentication procedure, comprise:
one or more instructions that, when executed by the one or more processors, cause the one or more processors to:
generate a value representing an authenticity of the user based on the difference between the additional user information and the baseline user data; and
request authentication information to authenticate the user based on the value representing the authenticity of the user.

* * * * *